Dec. 17, 1957 W. A. PIERCE 2,816,365
APPARATUS FOR TESTING FINGER WHEELS OF DIALS
Filed Jan. 20, 1955 2 Sheets-Sheet 1

INVENTOR
W. A. PIERCE
BY C. B. Hamilton
ATTORNEY

Dec. 17, 1957 W. A. PIERCE 2,816,365
APPARATUS FOR TESTING FINGER WHEELS OF DIALS
Filed Jan. 20, 1955 2 Sheets-Sheet 2
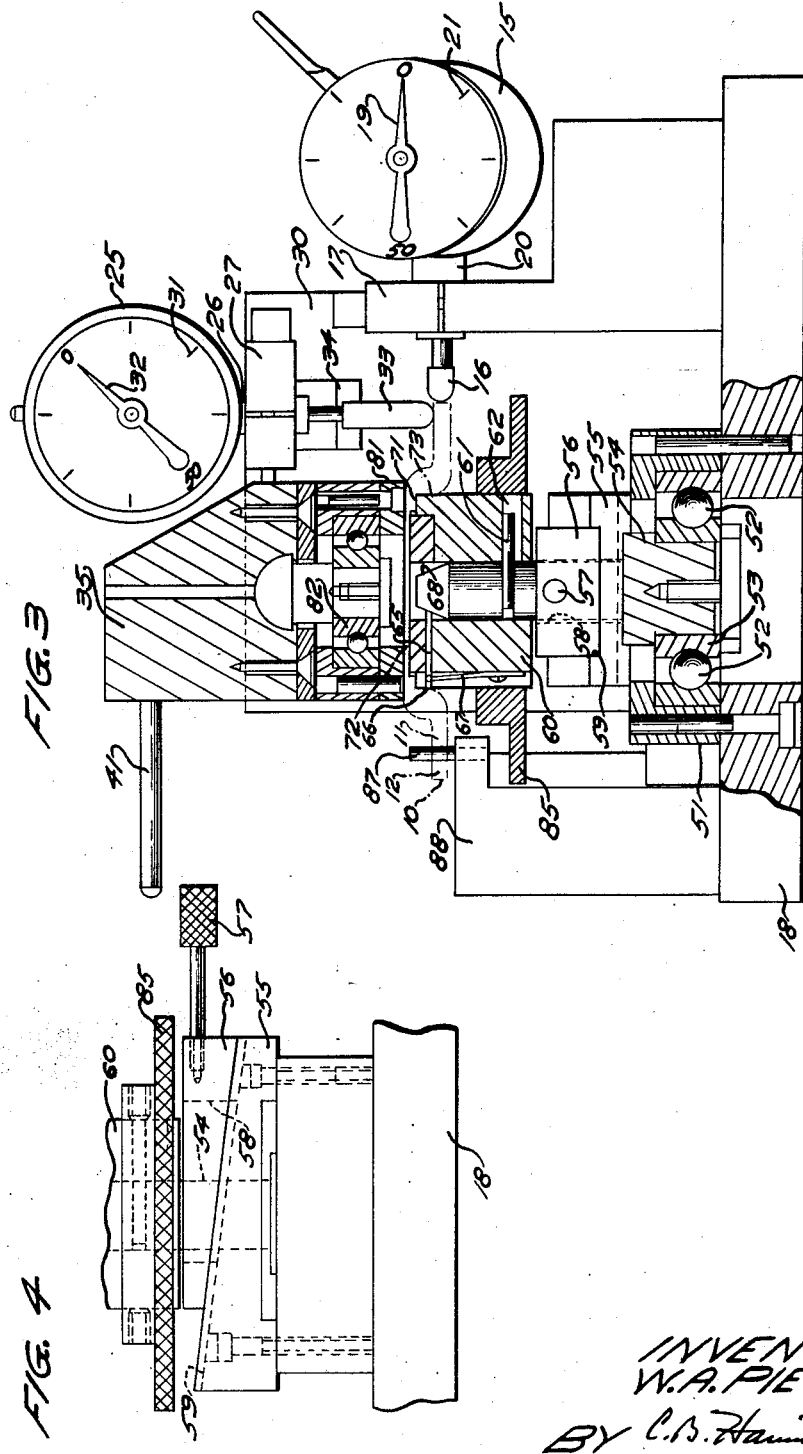
INVENTOR
W. A. PIERCE
BY C. B. Hamilton
ATTORNEY

United States Patent Office 2,816,365
Patented Dec. 17, 1957

2,816,365

APPARATUS FOR TESTING FINGER WHEELS OF DIALS

William A. Pierce, Indianapolis, Ind., assignor to Western Electric Company, Incorporated, New York, N. Y., a corporation of New York Application January 20, 1955, Serial No. 482,930

3 Claims. (Cl. 33—174)

This invention relates to apparatus for testing finger wheels of dials, and more particularly to apparatus for testing for eccentricity and flatness of each finger wheel.

An object of the invention is to provide apparatus for measuring the outside diameters of dial finger wheels.

Another object of the invention is to provide apparatus for measuring the flatness of dial finger wheels.

A further object of the invention is to provide apparatus for quickly and simultaneously measuring eccentricity and flatness of dial finger wheels.

An apparatus illustrating certain features of the invention may include a holder for receiving a dial finger wheel and movable from a loading position to a wheel-gripping position. A rotatable clamp cooperates with the holder to clamp the wheel therebetween, and a flatness gauge is movable to a position engaging a face of the wheel. There also may be provided an eccentricity gauge for engaging the rim of the wheel.

A complete understanding of the invention may be obtained from the following detailed description of an apparatus forming a specific embodiment thereof when read in conjunction with the appended drawings, in which—

Fig. 3 is a vertical section of the apparatus shown in Fig. 1, and

Fig. 4 is a fragmentary side elevation of the apparatus shown in Fig. 1.

Figure 2:
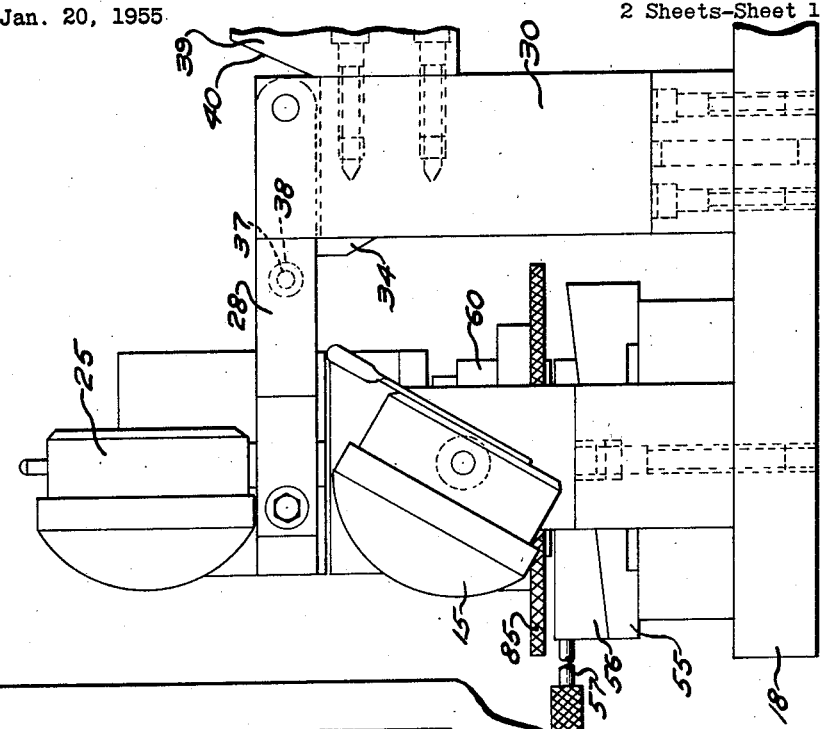
Fig. 2 is a fragmentary side elevation of the apparatus shown in Fig. 1.

Referring now in detail to the drawings, there is shown therein an apparatus for measuring the diameter of an outer edge 10 (Fig. 3) of a disc-like outer portion 12 of a telephone dial finger wheel 11, and also for measuring the flatness of the outer portion 12. The apparatus includes a dial indicator 15 having a spring-pressed plunger 16 for engaging the edge 10. The indicator 15 is mounted by a split clamp 17 fixed rigidly to a base 18 and clamping a housing 20 of the indicator. The dial indicator 15 includes a pointer 19 movable by the plunger 16 relative to a scale 21.

Figure 1:
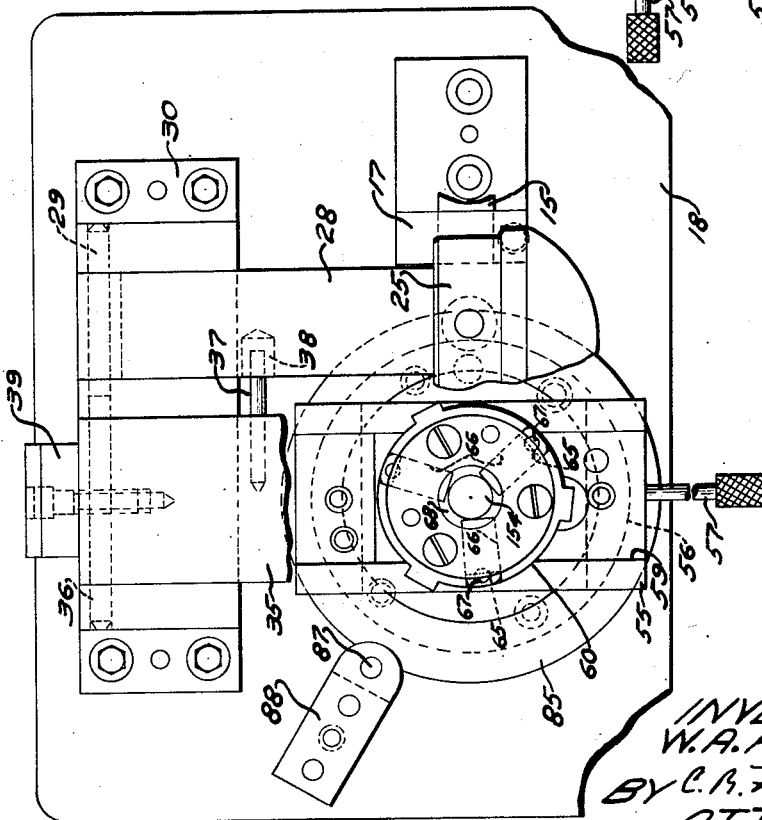
Fig. 1 is a fragmentary top plan view of an apparatus forming a specific embodiment of the invention.

A second dial indicator 25 has a housing 26 clamped by a split clamp 27 formed on an arm 28 mounted pivotally on a horizontal pin 29 (Fig. 1) positioned on a bracket 30 fixed to the base 18. The indicator 25 includes a scale 31 and a pointer 32 movable by a plunger 33 slidable vertically when the arm 28 is in a horizontal position as limited by a stop 34 (Fig. 2). The arm 28 is connected loosely to an arm 35 pivoted on a pin 36 by means of a pin 37 (Fig. 1) projecting into a larger bore 38. The arm 35 is pivotal between a horizontal operative position as determined by a stop 39 on the bracket 30 and a vertical loading position resting on a face 40 of the stop 39. A handle 41 (Fig. 3) is fixed rigidly to the arm 35.

A radial-and-thrust bearing outer race 51 is fixed to the base 18 and mounts through balls 52 an inner race 53 mounting a post 54. The post 54 projects upwardly through a fixed wedge 55 (Fig. 4) mounting a wedge 56, which has a handle 57, slidably thereon. The wedge 56 has an elongated opening 58 therein providing clearance for the post 54, and slides in a guideway 59. The wedge 56 is movable from an operative position shown in Fig. 4 to the left to a loading position, and, as it is so moved, it is moved upwardly by the wedge 55 and engages and raises a holder 60 splined to the post 54 through a pin 61 rigidly fixed to the post 54 and a vertical slot 62 in the holder 60. As the holder 60 is moved upwardly on the post 54, clamping rods 65 slidable in radial slots 66 are permitted to be slid radially inwardly by leaf springs 67 by the inner ends of the rods 65 being moved upwardly on a frustoconical end 68 of the post 54. This withdraws the rods from positions projecting beyond the holder 60 to permit the dial finger wheel 11 to be removed from the holder 60 after a test or be placed thereon for testing operations.

With the arms 28 and 35 pivoted back to their loading positions and the wedge 56 in its loading position, the dial finger wheel 11 is placed on the holder 60 with a boss 71 engaging the bottom 72 of a socket 73 formed in the wheel 11. The boss 71 is so made that the socket 73 fits slightly loosely over the holder 60. The handle 57 then is moved back to its lower position, and the holder 60 with the wheel 11 starts to move down the post 54 by gravity toward a position in which the pin 61 strikes the upper end of the slot 62. As the holder 60 so moves, the three rods 65 are pushed radially outwardly to precisely center the finger wheel 11 and grip it securely. The arms 28 and 35 then are swung to their horizontal positions, and a gripping ring 81 mounted rotatably by a radial-and-thrust bearing 82 mounted on the arm 35 seats the wheel 11 firmly on the holder 60 and moves the holder 60, if necessary, against the pin 61 to locate the wheel 11 at a predetermined height at which the periphery 10 thereof is engaged by the plunger 16 and the face of the flange 12 is engaged by the plunger 33. A knurled wheel 85 fixed to the holder 60 then is turned manually to rotate the wheel 11. Any eccentricity of the periphery relative to the socket 73 is indicated by the gauge 15. Also, variations in flatness of the flange 12 relative to the base of the socket 73 are indicated by the gauge 25 as the wheel 11 is rotated. A pin 87 mounted on an arm 88 is provided to detect any great eccentricity quickly.

The above-described apparatus serves to quickly and precisely measure eccentricity and flatness deviations of dial finger wheels, and does so with a minimum of effort on the part of an operator.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A device for gauging a finger wheel having a socket portion which comprises a lower cylindrical holder for receiving the socket portion of a finger wheel thereon, means mounting the holder rotatably, a rotatable clamping ring, means for moving the ring to a position clamping the wheel between the holder and the ring, centering means carried by the holder, means for actuating the centering means to grip the wheel and center the socket portion of the wheel on the holder, and gauge means mounted on the base eccentrically of the holder for engaging the wheel when clamped.

2. A gauge, which comprises a base, a post mounted rotatably on the base in a position projecting upwardly from the base and having a frustoconical portion on the upper extremity thereof, a holder splined to and slidable on the post, a wedge slidable on the base for moving the holder along the post, a plurality of centering rods mounted slidably on and generally transversely of the upper portion of the holder, means urging the rods into engagement with the frustoconical portion of the post, a rotatable clamp pivotal toward and away from the upper portion of said post for clamping a circular work piece between said holder and said clamp, a flatness gauge secured to the clamp and adapted to engage a surface of the work piece when the clamp abuts the center of the work piece, and an eccentricity gauge mounted on the base for engaging the periphery of a work piece held by the holder and the clamp.

3. A gauging device for measuring the surface smoothness and peripheral eccentricity of a circular work piece having a recessed portion comprising a base, a post rotatably mounted on said base with a frustoconical portion formed on the free extremity thereof, a holder secured to and slidable longitudinally of the post, a plurality of centering rods slidable within a plurality of radially disposed apertures formed in the end of said holder which is adjacent the frustoconical portion of said post, said centering rods being adapted to engage the recessed portion of the work piece when urged radially outwardly by the frustoconical portion of said post, means secured to said holder for urging said centering rods into engagement with the frustoconical portion of said post, wedge means slidably secured to said base for effecting reciprocation of said holder along said post to actuate said centering means, a rotatable clamping member secured to said base and movable toward and away from the free extremity of said post for clamping a work piece between said holder and said clamp, a first gauge secured to said movable clamping member and having a feeler adapted to engage a surface of said work piece when said clamp is in a clamping position, a second gauge secured to said base and having a feeler adapted to engage the periphery of said work piece when said work piece is clamped in position, and means for rotating said holder and said work piece relative to said gauges.

References Cited in the file of this patent

UNITED STATES PATENTS

| | | | |
|---|---|---|---|
| 487,988 | Cameron | | Dec. 13, 1892 |
| 714,367 | Demarty | | Nov. 25, 1902 |
| 1,391,509 | Rouanet | | Sept. 20, 1921 |
| 1,771,389 | Avila | | July 29, 1930 |
| 2,340,978 | Orcutt | | Feb. 8, 1944 |
| 2,371,451 | Larson | | Mar. 13, 1945 |
| 2,601,447 | Neff | | June 24, 1952 |
| 2,683,983 | Aller | | July 20, 1954 |